United States Patent [19]

Tanaka

[11] 4,330,180
[45] May 18, 1982

[54] ZOOM LENS SYSTEM HAVING A PLURAL NUMBER OF RELAY LENSES

[75] Inventor: Kazuo Tanaka, Tokyo, Japan

[73] Assignee: Canon Kabushiki Kaisha, Tokyo, Japan

[21] Appl. No.: 78,769

[22] Filed: Sep. 25, 1979

[30] Foreign Application Priority Data

Sep. 28, 1978 [JP] Japan .................. 53-119488

[51] Int. Cl.³ .................. G02B 15/02; G02B 15/14
[52] U.S. Cl. .................. 350/427; 350/422
[58] Field of Search .................. 350/183, 184, 38, 422, 350/423, 427, 428

[56] References Cited

U.S. PATENT DOCUMENTS

| | | | |
|---|---|---|---|
| 4,009,942 | 3/1977 | Hirose | 350/183 |
| 4,015,895 | 4/1977 | Hirose | 350/183 |
| 4,146,305 | 3/1979 | Tanaka | 350/183 |
| 4,157,211 | 6/1979 | Tanaka et al. | 350/183 |

Primary Examiner—John K. Corbin
Assistant Examiner—Scott J. Sugarman
Attorney, Agent, or Firm—Toren, McGeady and Stanger

[57] ABSTRACT

The disclosed invention involves a zoom lens system having a plural number of pick-up tubes whose picture sizes are different from each other, a zoom section which is mounted at the object end of each of the pick-up tubes and which has a focusing front lens group, a variator and a compensator for zooming and a number of relay lenses which have respective focal lengths corresponding to the picture size of each of the pick-up tubes. Each of the relay lenses can be mounted between the zoom sections and one of the pick-up tubes. Each of the relay lenses consists of a primary group and a secondary group and a common attachment lens can be mounted in each of the relay lenses. The distance between the zoom section and the pick-up tube is maintained constant without changing the focus whether the attachment lens is mounted or not.

5 Claims, 32 Drawing Figures

ZOOM LENS SYSTEM HAVING A PLURAL NUMBER OF RELAY LENSES

BACKGROUND OF THE INVENTION

The present invention relates to a zoom lens, particularly having interchangeable relay lenses in which a magnifying attachment is inserted so as to change the range of the variable focal length.

Methods and means for changing the range of the variable focal length of a photographic camera or a television camera without dismounting the zoom lens in U.S. Pat. No. 4,015,895 or Ser. No. 692,518, now U.S. Pat. No. 4,240,697, U.S. Pat. No. 4,157,211, U.S. Pat. No. 4,146,305 and Ser. No. 28,442.

As in the present invention an attachment lens can be mounted between the zoom section and the photo-detecting surface in such a manner that the range of the variable focal length can easily be changed.

On the other hand, the taking lens has various picture sizes in accordance with the film to be used or the size of the pick-up tube. For example, in a 35 mm still picture camera the maximum image height $Y = 21.635$, in super 8 motion picture camera $Y = 3.58$ and in a 1" pick-up tube $Y = 8.0$. It is very often difficult from the economical or other reasons to prepare the zoom lenses which fit to all the picture sizes. Hence it is possible to use one zoom part in common with several relay lenses by exchanging them for each other. What is important with such kind of interchangeable relay lenses is that the light beam passing through the focusing lens group as well as the movable lens group at the time of zooming has to be unchanged regardless of the exchange of the relay lenses. Consequently, the focal lengths and the F numbers are changed so as to keep the picture angle constant. Therefore, it is essential that Focal length $f_2 = (Y_2/Y_1)f_1$, $f_3 = (Y_3/Y_1)f_1$, F number $F_{n2} = (Y_2/Y_1)F_{n1}$, $F_{n3} = (Y_3/Y_1)F_{n1}$, Here, the maximum image height of each picture size is $Y_1, Y_2, Y_3 \ldots$, the focal length $f_1, f_2, f_3 \ldots$ and F number $F_{n1}, F_{n2}, F_{n3} \ldots$.

SUMMARY OF THE INVENTION

A purpose of the present invention is to provide a zoom lens system in which the zoom section can be used regardless of the picture sizes.

Another purpose of the present invention is to provide a zoom lens system in which the range of the focal lengths can be varied by inserting an attachment in the relay lens of the zoom lens.

DESCRIPTION OF THE PREFERRED EMBODIMENTS

Figure 1:
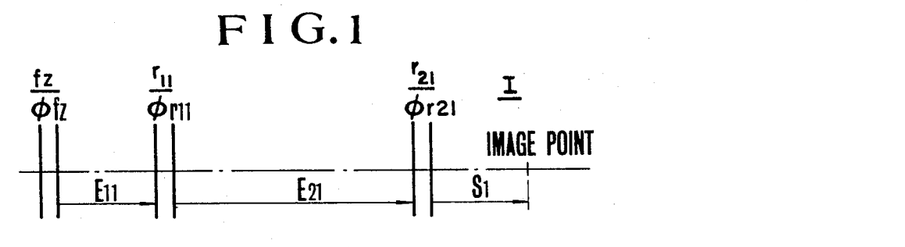
FIGS. 1 to 4 respectively show the lens groups for forming a zoom lens of the present invention with thin lenses.

FIG. 1 shows the power arrangement of a zoom lens I with a thin lens system. Now let us assume that the power of the zoom part including a front lens group fz focused an infinity (and consisting of totally movable parts or of a movable and a fixed part for focusing) and at least two lens groups (for example a variator and a compensator) movable for zooming, that of the front relay lens group r11' and that of the rear relay lens group r21 are $\phi_{fz}$, $\phi_{r11}$ and $\phi_{r21}$, and the distances between the principal points for respective parts are $E_{11}$ and $E_{21}$.

The then focal length $f_1$ of the zoom lens I is represented by $$[\phi_{fz} - E_{11}, \phi_{r11}, -E_{21}, \phi_{r21}] = 1/f_1 \qquad (1)$$

while the back focus $S_1$ is represented with $$[\phi_{fz} - E_{11}, \phi_{r11}, -E_{21}]/f_1 = S_1 \qquad (2)$$

In the above [...] are so-called Gaussian Brackets, described on page 457 of "Modern Geometrical Optics" by M. Herzberger (International Publishers, Inc., New York, 1958) or other reference books.

Figure 2:
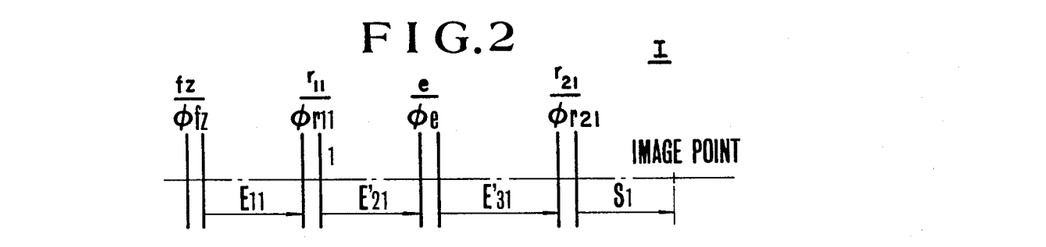

Now let us assume that the front and the rear relay lens group of the zoom lens are left as they are, that a variable magnification lens e whose power is $\phi_e$ and the distance between whose primary principal point and whose secondary principal point is $\Delta E$, namely a so called extender is inserted between the two relay lens groups r11 and r21' that this is done in such a manner that the total system is multiplied by m, and the optical axis of the extender e is in alignment with that of the both relay lens groups r11 and r21. It is desirable to choose m so it is larger than 1 for compensation of aberrations.

FIG. 2 shows the power arrangement as a thin lens system in the aforementioned condition.

Now, let the distance between the principal point of the front relay lens group r11 and that of the variable magnification lens e be $E'_{21}$ and the distance between the principal point of the variable magnification lens e and that of the rear relay lens group r21 be $E'_{31}$. Then, $$E'_{21} = E_{21} - \Delta E - \frac{\alpha}{\alpha \phi_{r21} - \beta} \quad (3)$$

$$E'_{31} = \frac{\alpha}{\alpha \phi_{r21} - \beta} \quad (4)$$

Further, the power $-\phi_e$ of the variable magnification lens e is represented by:

$$\phi_e = \frac{\alpha}{[\phi_{fb} - E_{11}, \phi_{r11}, -E'_{21}][-E'_{31}]f_1 \cdot m} \quad (5)$$

Figure 3:
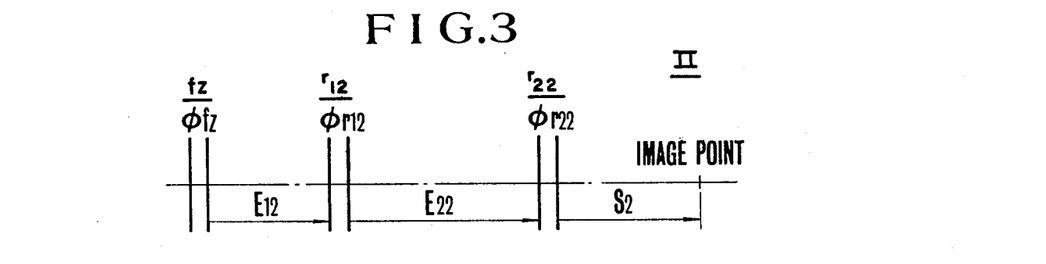
Figure 4:
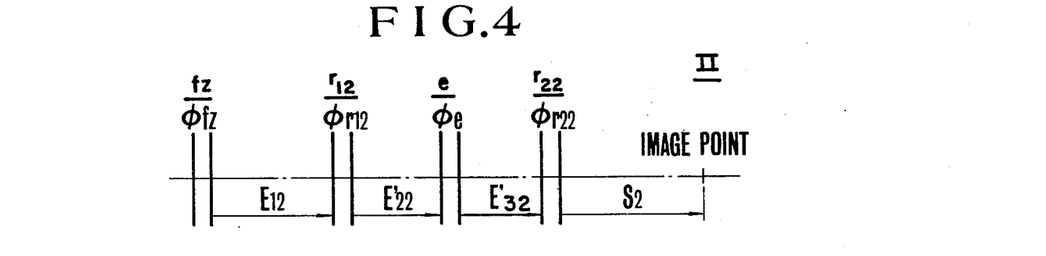

Where, $\alpha = S_1 - [\phi_{fb} - E_{11}, \phi_{r11}, (\Delta E - E_{21})]f_1 \cdot m$ $\beta = 1 - [\phi_{fb} - E_{11}, \phi_{r11}, (\Delta E - E_{21}), \phi_{r21}]f_1 \cdot m$ Now let us consider a zoom lens II, wherein only the relay lens groups of the zoom lens I is replaced with the other relay lens group so as to produce the focal length between $f_2$ and the back focus $S_2$, while the aforementioned variable magnification lens can be used without modification. Let the distance between the principal point of the zoom part and that of a front relay lens group r12 be $E_{12}$ and the distance between the principal point of the new front relay lens group and that of a new rear relay lens group r22 be $E_{22}$, so the focal length of the total system is represented by:

$$[\phi_{fb} - E_{12}, \phi_{r12}, -E_{22}, \phi_{r22}] = 1/f_2 \quad (6)$$

while the back focus $S_2$ is represented by:

$$[\phi_{fb} - E_{12}, \phi_{r12}, -E_{22}]f_2 = S_2 \quad (7)$$

Now let us suppose that a variable magnification lens e to be used in common is mounted in such a manner that the back focus $S_2$ is maintained as it is, while the focal length is converted into $f_2 \cdot m$, so the following equation is established:

$$[\phi_{fb} - E_{12}, \phi_{r12}, -E'_{22}, \phi_e, -E'_{32}, \phi_{r22}] = 1/m \cdot f_2 \quad (8)$$

$$[\phi_{fb} - E_{12}, \phi_{r12}, -E'_{22}, \phi_e, -E'_{32}]m \cdot f_2 = S_2 \quad (9)$$

$$E'_{22} + \Delta E + E'_{32} = E_{22} \quad (10)$$

Here, $E'_{22}$ and $E'_{32}$ are respectively the distance between the secondary principal point of the front relay lens group r12 and the primary principal point of the variable magnification lens and the distance between the secondary principal point of the variable magnification lens and the primary principal point of the rear relay lens group r22. When the power arrangement of the thin lens system is determined as mentioned above, the relay lenses of the zoom lens I can be exchanged for those of the zoom lens II, while the variable magnification lens can be used with either of the relay lens groups. The equations (8), (9) and (10) are for the parameters of the relay lenses, namely $\phi_{r12}$, $\phi_{r22}$, $E_{12}$, $E_{22}$, $E'_{22}$ and $E'_{32}$. Some of the parameters can be taken as known amount so as to obtain others or further aberrations can be taken into consideration so as to obtain other parameters.

An example which satisfies (8), (9) and (10) is as follows:

$$E_{12} = E_{11}$$

$$E_{22} = \frac{[\phi_{fb} - E_{11}] - S_2}{[\phi_{fb} - E_{12}, \phi_{r11}]f_2}$$

$$E'_{22} = E_{22}$$

$$E'_{32} = E_{22} - \Delta E - E'_{22}$$

$$\phi_{r12} = \phi_{r11}$$

$$\phi_{r22} = \frac{1 - [\phi_{fb} - E_{11}, \phi_{r11}]f_2}{f_2 [\phi_{fb} - E_{11}, \phi_{r11}, -E_{22}]}$$

On the other hand, by enlarging the above equation the power arrangement of the first zoom lens ($1 \leq j \leq K$) out of the K pieces of zoom lenses whose relay lenses can be exchanged for each other can be decided as follows:

$$[\phi_{fb} - E_{1i}, \phi_{ri}, -E_{2i}, \phi_{r2i}] = 1/f_i$$

$$[\phi_{fb} - E_{1i}, \phi_{r1i}, -E_{2i}]f_i = S_i$$

$$[\phi_{fb} - E_{1i}, \phi_{r1i}, -E'_{2i}, \phi_e, -E'_{3i}, \phi_{r2i}] = 1/(m \cdot f_i)$$

$$[\phi_{fb} - E_{1i}, \phi_{r1i}, -E'_{2i}, \phi_e, -E'_{3i}]m \cdot f_i = S_i$$

$$E_{2i} = E'_{2i} + \Delta E + E'_{3i}$$

With the above the variable magnification lens can be used for all of the zoom lenses.

Below is a numerical example in which the aberrations are taken into consideration. Here, the zoom lens I is a picture pick-up zoom lens of $1\frac{1}{4}$ inches, while the zoom lens II is a picture pick-up zoom lens of 1 inch.

Figure 5:
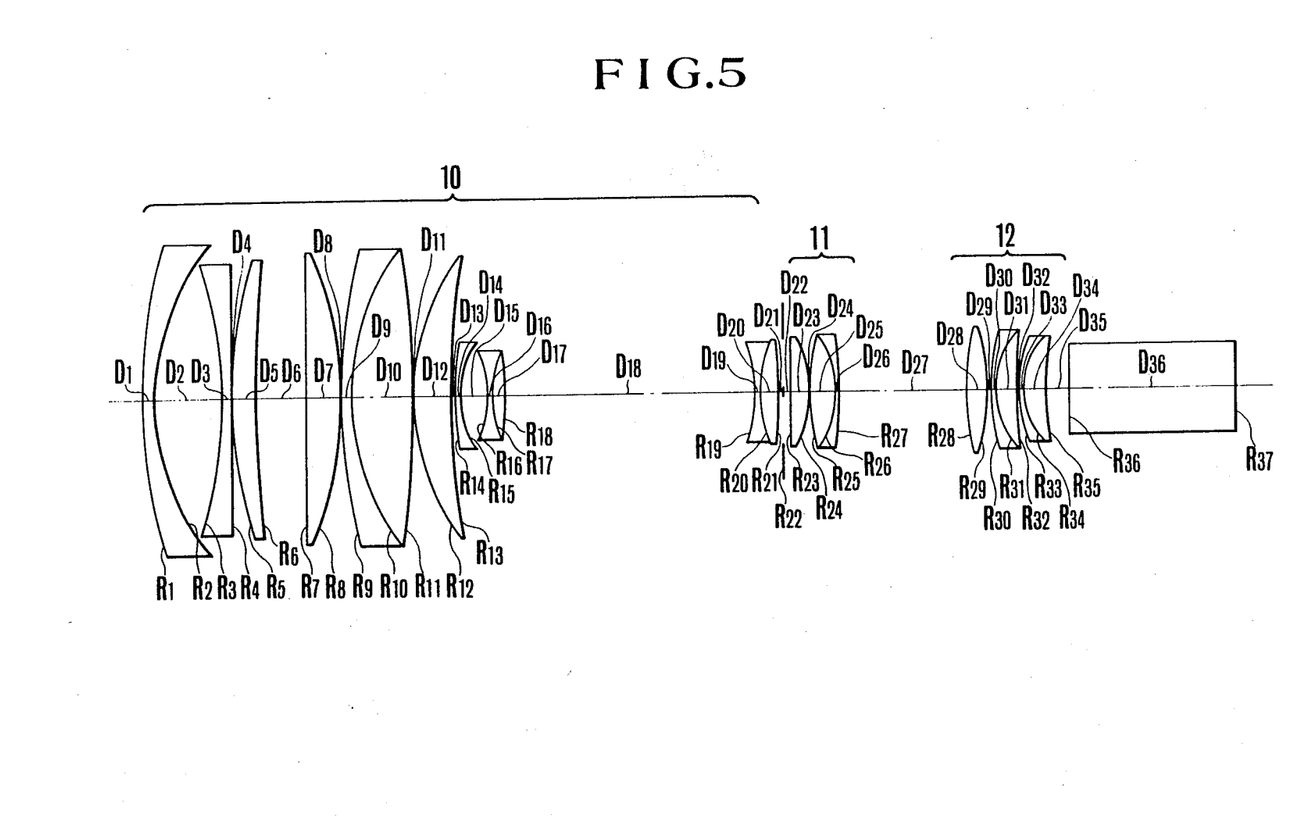
FIG. 5 is a schematic section representation of a zoom lens I embodying the present invention in section.
Figure 6:
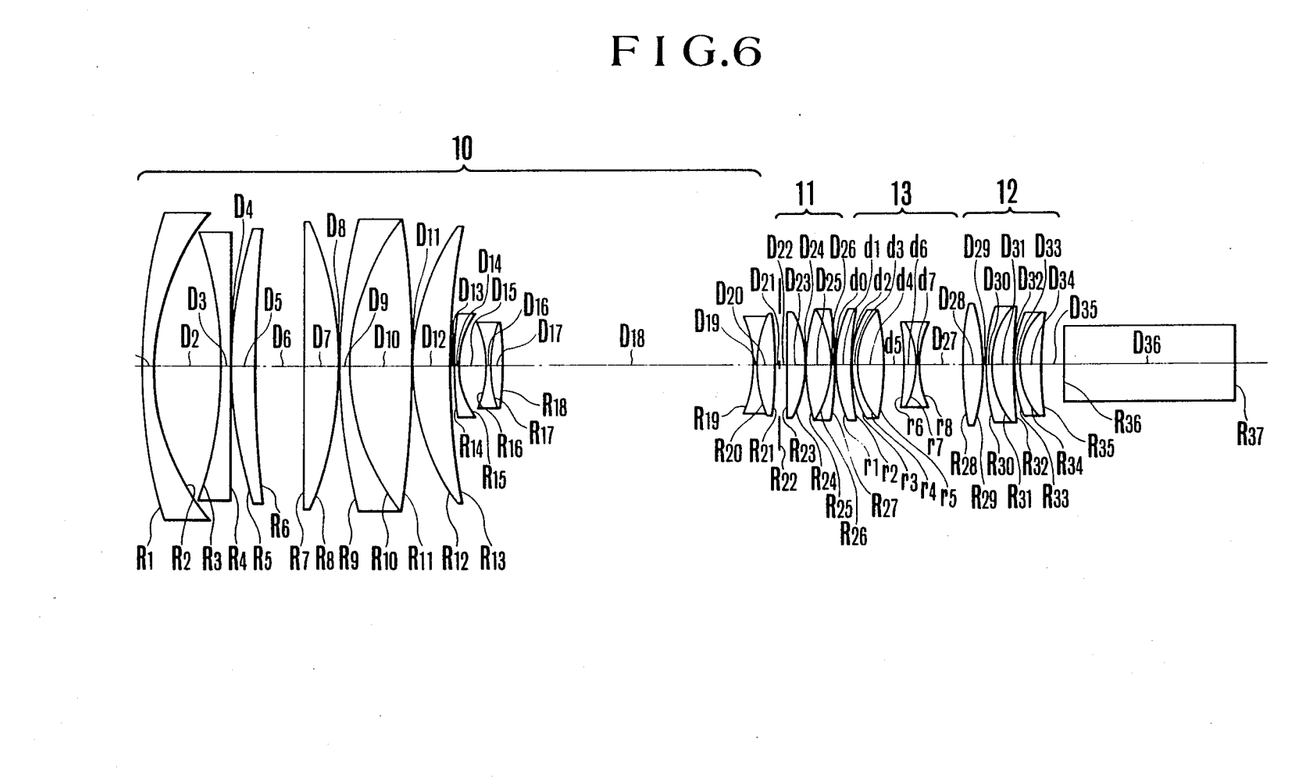
FIG. 6 shows the zoom lens I with an attachment lens inserted.

The zoom lens I shown in FIGS. 5 and 6 is composed of the zoom part 10, a front relay lens group 11 and a rear relay lens group 12. Surfaces with dimensions R14 to R18 belong to the variator, R19 to R21 to the compensator and R22 the aperture.

TABLE 1

| Focal distance f = 19-200 mm F number = 1:2.1 Zoom part (10) | | | | |
|---|---|---|---|---|
| | R | D | Nd | νd |
| 1 | 245.25 | 5.10 | 1.69680 | 55.5 |
| 2 | 105.57 | 28.70 | | |
| 3 | −190.07 | 4.20 | 1.69680 | 55.5 |
| 4 | 2210.70 | 0.20 | | |
| 5 | 203.74 | 10.12 | 1.69895 | 30.1 |
| 6 | 557.18 | 10.35 | | |
| 7 | −5852.30 | 14.63 | 1.62041 | 60.3 |
| 8 | −166.67 | 0.30 | | |
| 9 | 256.47 | 4.50 | 1.84666 | 23.9 |
| 10 | 107.35 | 26.34 | 1.62041 | 60.3 |
| 11 | −489.90 | 0.30 | | |
| 12 | 104.18 | 16.51 | 1.62041 | 60.3 |
| 13 | 362.86 | 1.53 | | |
| 14 | 200.01 | 2.00 | 1.80400 | 46.6 |
| 15 | 41.99 | 11.57 | | |
| 16 | −47.85 | 2.00 | 1.80400 | 46.6 |
| 17 | 63.41 | 4.95 | 1.92286 | 21.3 |
| 18 | −309.49 | 108.35 | | |
| 19 | −59.51 | 1.70 | 1.75700 | 47.9 |
| 20 | 65.39 | 7.50 | 1.74077 | 27.8 |
| 21 | −265.93 | 2.12 | | |
| 22 | aperture | 2.99 | | |

Here, D13, D18 and D21 are the variable distances, and the values in the table are those at the end of the wide angle side.

TABLE 2

Front relay lens group (11) and the rear relay lens group (12)

| | R | D | Nd | νd |
|---|---|---|---|---|
| 23 | −2210.70 | 8.02 | 1.51633 | 64.1 |
| 24 | −53.61 | 0.50 | | |
| 25 | 99.26 | 10.78 | 1.48749 | 70.1 |
| 26 | −46.23 | 1.40 | 1.80610 | 40.9 |
| 27 | −206.12 | 54.55 | | |
| 28 | 142.29 | 8.62 | 1.50137 | 56.4 |
| 29 | −100.33 | 2.00 | | |
| 30 | 105.57 | 1.70 | 1.83400 | 37.2 |
| 31 | 39.99 | 10.09 | 1.64000 | 60.1 |
| 32 | 263.87 | 0.30 | | |
| 33 | 61.24 | 2.00 | 1.74900 | 35.3 |
| 34 | 34.73 | 9.51 | 1.50137 | 56.4 |
| 35 | 133.78 | 10.00 | | |
| 36 | ∞ | 72.60 | 1.51633 | 64.1 |
| 37 | ∞ | 21.64 | | |

Here, dimensions R36 and R37 are the equivalent dimensions for a three color solving system. In FIG. 6 a variable magnification lens 13 is inserted between the front 11 and the rear relay lens group 12.

TABLE 3

Variable magnificaton lens (13)

| | r | d | Nd | νd |
|---|---|---|---|---|
| 0 | | 1.00 | | |
| 1 | 67.95 | 5.90 | 1.51633 | 64.1 |
| 2 | 135.01 | 0.50 | | |
| 3 | 46.33 | 1.80 | 1.75520 | 27.5 |
| 4 | 33.77 | 11.68 | 1.48749 | 70.1 |
| 5 | −119.24 | 8.71 | | |
| 6 | −166.67 | 5.00 | 1.72825 | 28.5 |
| 7 | −42.65 | 1.50 | 1.77250 | 49.6 |
| 8 | 47.69 | 18.44 | | |

Below the focal distances of respective parts before the variable magnification lens is inserted in the zoom lens I and those after the variable magnification lens has been inserted are given. Hereby, fz corresponds to the zoom part 10, r11 the front lens group 11 and r21 the rear lens group 12.

TABLE 4

| | 1/φ | E |
|---|---|---|
| fz | −15.94851 | 61.8632 |
| r11 | 86.07248 | 64.4091 |
| r21 | 90.44543 | |

$f_1 = 19.153$
$S_1 = 100.87$

TABLE 5

| | 1/φ | E |
|---|---|---|
| fz | −15.94851 | 61.8632 |
| r11 | 86.07248 | −467.7372 |
| e | 1048.55267 | 364.3236 |
| r21 | 90.44543 | |

$m \cdot f_1 = 28.50$
$m = 1.49$

Figure 7:
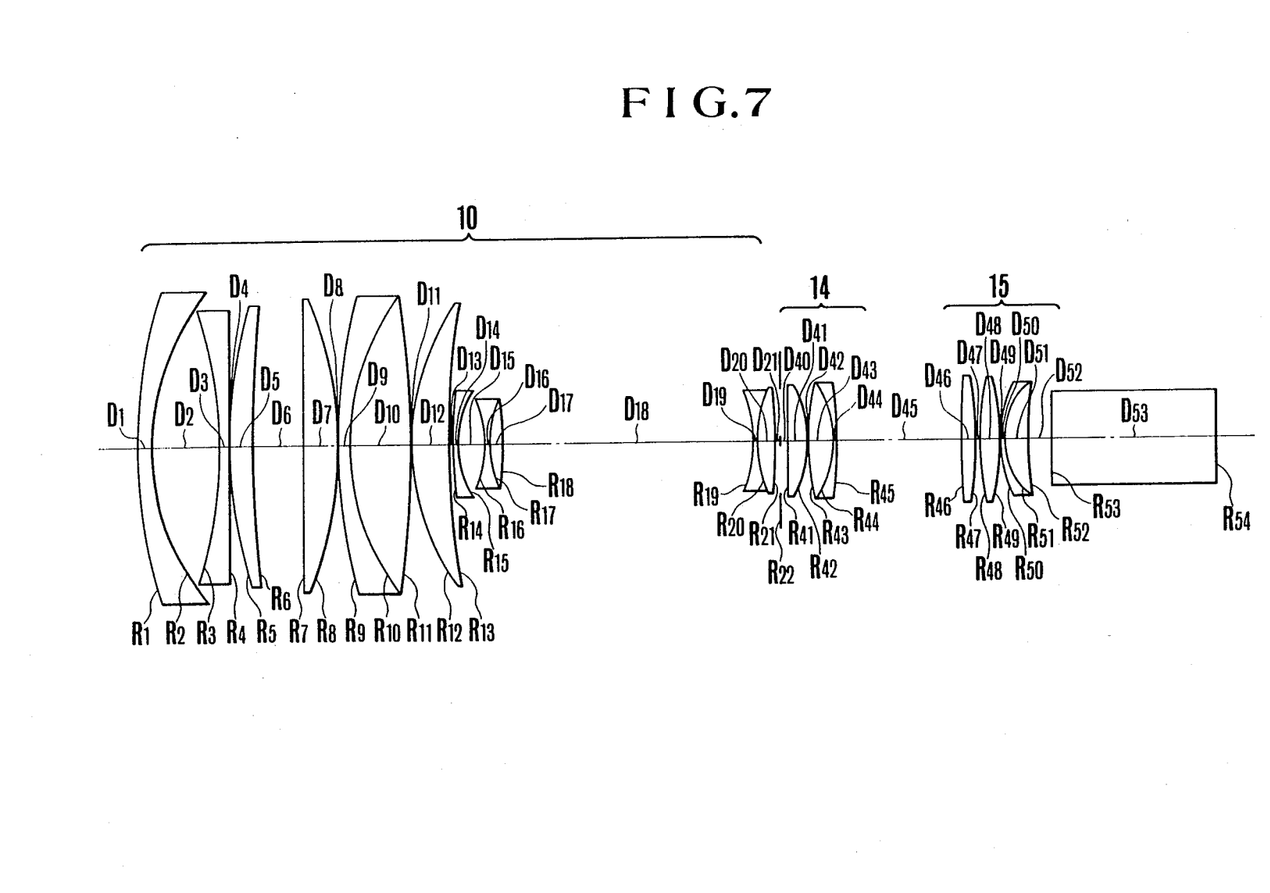
FIG. 7 is a schematic sectional representation of a zoom lens II according to another embodiment of the present invention.

FIG. 7 shows a front relay lens group 14 and a rear relay lens group 15 whose focal distances are different from each other and which are to be mounted at the back of the zoom part 10.

TABLE 6

Front relay lens group (14) and the rear relay lens group (15)

| | R | D | Nd | νd |
|---|---|---|---|---|
| 40 | | 2.99 | | |
| 41 | −2210.70 | 8.02 | 1.51633 | 64.1 |
| 42 | −53.61 | 0.50 | | |

TABLE 6-continued

Front relay lens group (14) and the rear relay lens group (15)

| | R | D | Nd | νd |
|---|---|---|---|---|
| 43 | 99.26 | 10.78 | 1.48749 | 70.1 |
| 44 | −46.23 | 1.40 | 1.80610 | 40.9 |
| 45 | −206.12 | 54.55 | | |
| 46 | 778.37 | 5.83 | 1.48749 | 70.1 |
| 47 | −193.47 | 2.00 | | |
| 48 | 140.07 | 8.43 | 1.51633 | 64.1 |
| 49 | −126.22 | 0.30 | | |
| 50 | 52.05 | 1.60 | 1.75520 | 27.5 |
| 51 | 30.79 | 10.54 | 1.48749 | 70.1 |
| 52 | 168.42 | 10.0 | | |
| 53 | ∞ | 69.2 | 1.51633 | 64.1 |
| 54 | ∞ | 8.3 | | |

Figure 8:
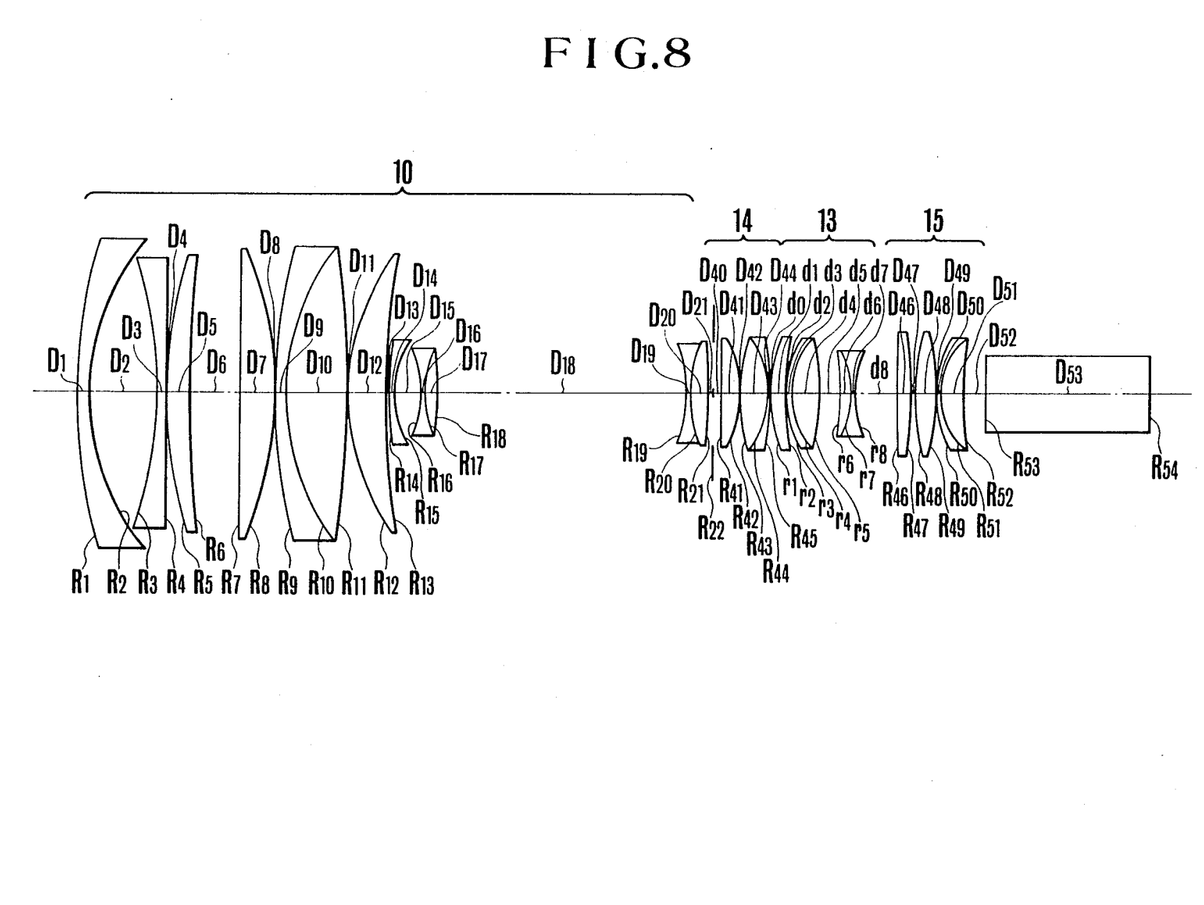
FIG. 8 shows the zoom lens II in section with an attachment lens is inserted.
Figure 9A:
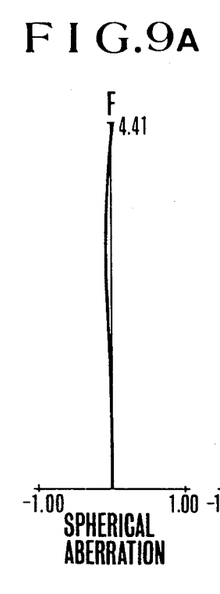
FIGS. 9A to 9C respectively show an aberration curves of the zoom lens I when the zoom lens I is at the wide angle side.
Figures 9B, 9C:
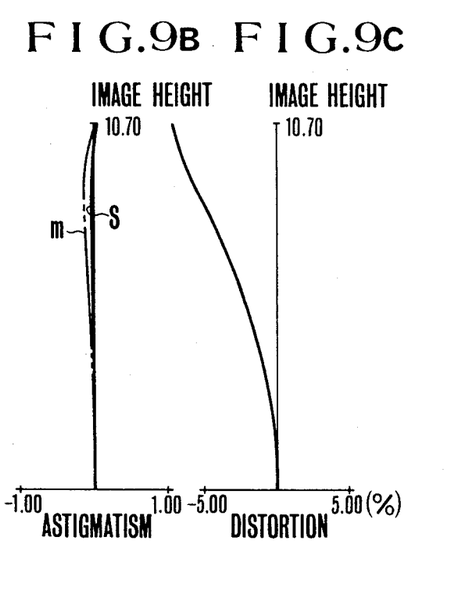
Figure 10A:
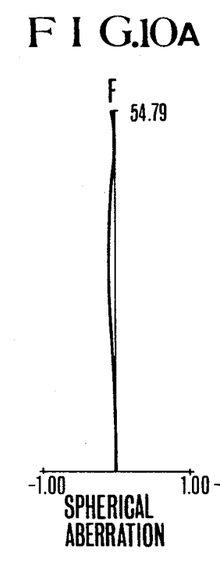
FIGS. 10A to 10C respectively show an aberration curve of the zoom lens I when the lens I is at the telephoto side.
Figures 10B, 10C:
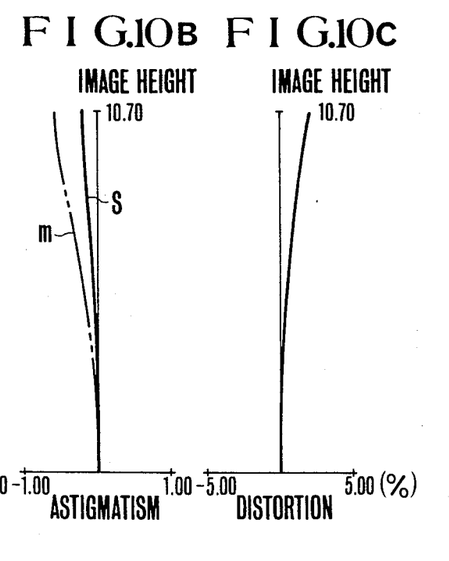
Figure 11A:
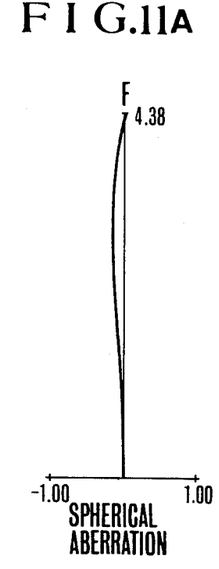
FIGS. 11A to 11C respectively show an aberration curve of the zoom lens I when the lens I is at the wide angle side, whereby the attachment lens is inserted.
Figure 11B:
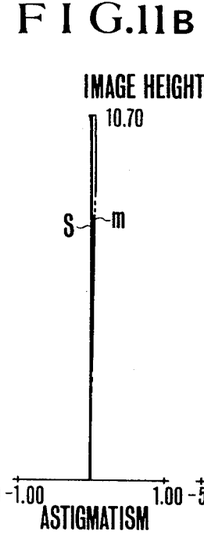
Figure 11C:
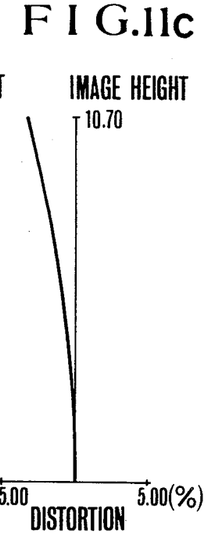
Figure 12A:
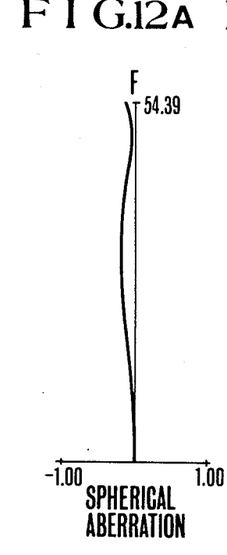
FIGS. 12A to 12C respectively show an aberration curve of the zoom lens I when the lens I is at the telephoto size; whereby the attachment lens is inserted.
Figure 12B:
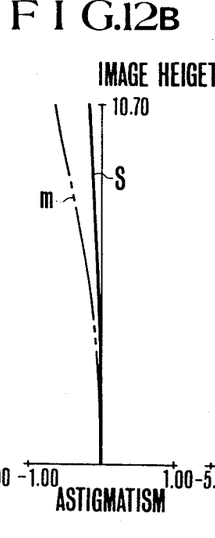
Figure 12C:
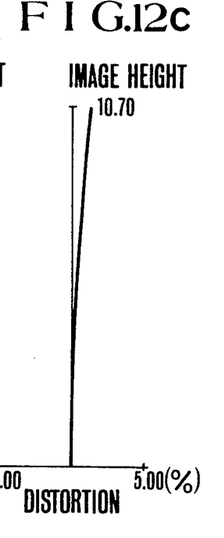
Figure 13A:
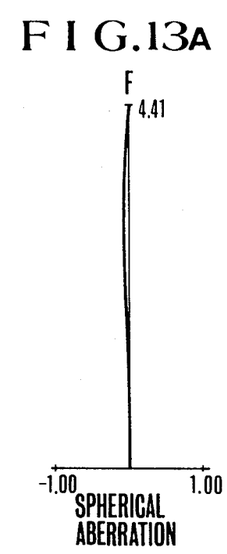
FIGS. 13A to 13C respectively show an aberration curve of the zoom lens II when the lens II is at the wide angle side.
Figures 13B, 13C:
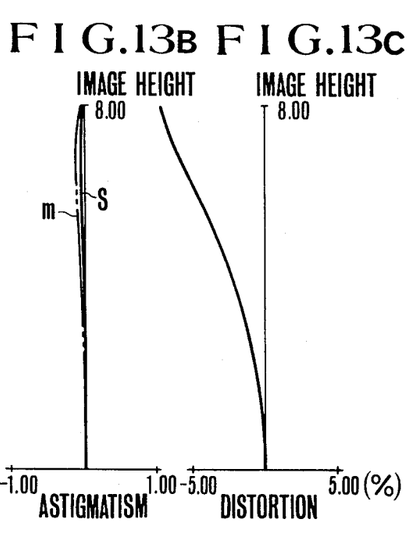
Figure 14A:
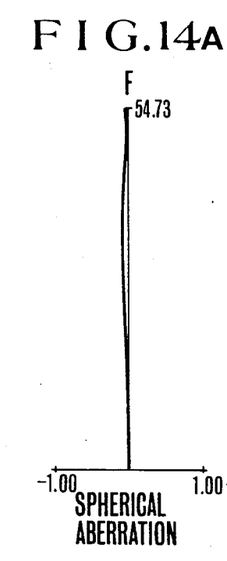
FIGS. 14A to 14C respectively show an aberration curve of the zoom lens II when the lens II is at the telephoto side.
Figure 14B:
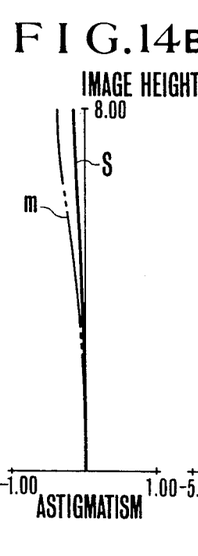
Figure 14C:
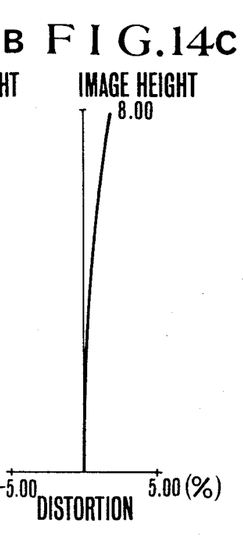
Figure 15A:
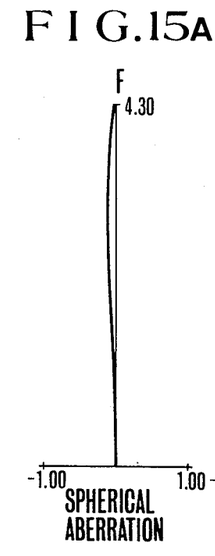
FIGS. 15A to 15C respectively show an aberration curve of the zoom lens II when the lens II is at the wide angle side, whereby the attachment lens is mounted.
Figures 15B, 15C:
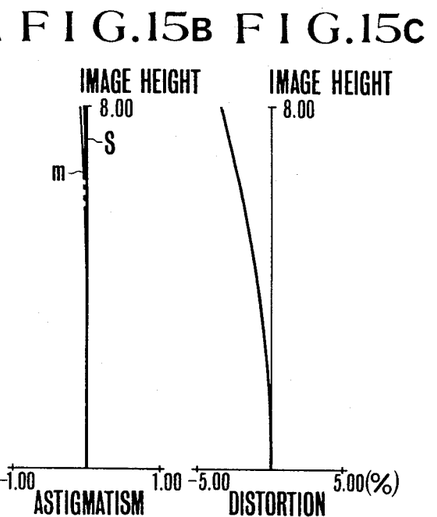
Figure 16A:
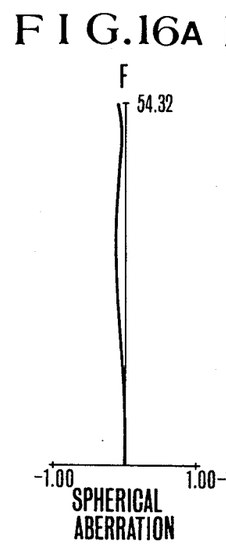
FIGS. 16A to 16C respectively show an aberration curve of the zoom lens II when the lens II is at the telephoto side, whereby the attachment lens is mounted.
Figures 16B, 16C:
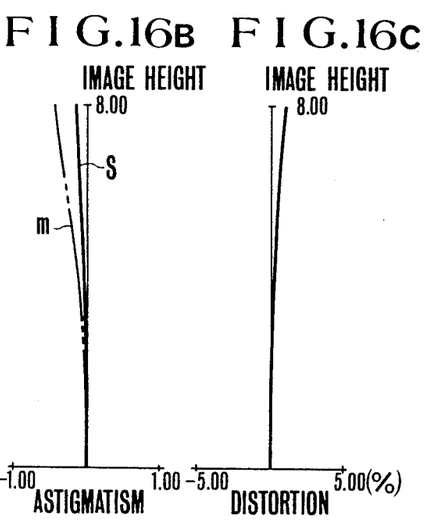

FIG. 8 shows the aforementioned variable magnification lens (13) mounted between the front relay lens group (14) and the rear relay lens group (15).

TABLE 7

| | R (r) | D (d) | Nd | νd |
|---|---|---|---|---|
| 40 | | 2.99 | | |
| 41 | −2210.70 | 8.02 | 1.51633 | 64.1 |
| 42 | −53.61 | 0.50 | | |
| 43 | 99.26 | 10.78 | 1.48749 | 70.1 |
| 44 | −46.23 | 1.40 | 1.80610 | 40.9 |
| 45 | −206.12 | 1.00 | | |
| 1 | 67.95 | 5.90 | 1.51633 | 64.1 |
| 2 | 135.01 | 0.50 | | |
| 3 | 46.33 | 1.80 | 1.75520 | 27.5 |
| 4 | 33.77 | 11.68 | 1.48749 | 70.1 |
| 5 | −119.24 | 8.71 | | |
| 6 | −166.67 | 5.02 | 1.72825 | 28.5 |
| 7 | −42.65 | 1.50 | 1.77250 | 49.6 |
| 8 | 47.69 | 18.44 | | |
| 46 | 778.37 | 5.83 | 1.48749 | 70.1 |
| 47 | −193.47 | 2.00 | | |
| 48 | 140.07 | 8.43 | 1.51633 | 64.1 |
| 49 | −126.22 | 0.3 | | |
| 50 | 52.05 | 1.6 | 1.75520 | 27.5 |
| 51 | 30.79 | 10.54 | 1.48749 | 70.1 |
| 52 | 168.42 | 10.0 | | |
| 53 | ∞ | 69.2 | 1.51633 | 64.1 |
| 54 | ∞ | 8.3 | | |

Below the focal distances of the parts before the variable magnification lens is inserted in the zoom lens II and those after the variable magnification lens has been inserted are given.

TABLE 8

| | 1/φ | E |
|---|---|---|
| fz | −15.94851 | 61.8632 |
| r12 | 86.07248 | 64.4091 |
| r22 | 71.10978 | |

$f_2 = 14.587$
$S_2 = 77.35$

TABLE 9

| | 1/φ | E |
|---|---|---|
| fz | −15.94851 | 61.8632 |
| r12 | 86.07248 | −467.7372 |
| e | 1048.55267 | 370.3368 |
| r22 | 71.10978 | |

$m \cdot fz = 21.703$
$m = 1.49$

Here, r12 and r22 respectively correspond to the front lens group 14 and the rear lens group 15.

FIG. 9 to FIG. 16 show the spherical aberrations, the astigmatism and the distortions of the arrangements.

What is claimed is:

1. A zoom lens system comprising:

a zoom portion including a front lens group for focusing and a plurality of movable lens groups for zooming;

a plurality of rear lens groups, each rear lens group being interchangeable in an optical path between the zoom portion and an image plane, only one rear lens group being arranged in the optical path, and each of said rear lens groups having a different focal length so as to produce a different picture size on the image plane; and attachment lens means usable in common with all of the rear lens groups, said attachment lens means being attachable to the rear lens group on the single optical path between the zoom portion and the image plane to change the focal length of the whole zoom lens system.

2. A zoom lens system in accordance with claim 1, wherein the following relations can be established:

$[\phi_{fz} - E_{1i}\phi_{r1i} - E_{2i}\phi_{r2i}] = 1/f_i$ $[\phi_{fz} - E_{1i}\phi_{r1i} - E_{2i}]F_i = S_i$ $[\phi_{fz} - E_{1i}\phi_{r1i} - E'_{2i}\phi_e - E'_{3i}\phi_{r2i}] = 1/mf_i$ $[\phi_{fz} - E_{1i}\phi_{r1i} - E'_{2i}\phi_e - E'_{3i}]mF_i = S_i$ $E_{2i} = E'_{2i} + \Delta E + E'_{3i}$ ([ . . . ] are Gaussian Brackets)
wherein
- $\phi_{fz}$: composed power of the zoom part focused on infinity
- $\phi_{r1i}$: power of the first sub-group of the i-th rear lens group
- $\phi_{r2i}$: power of the second sub-group
- $\phi_e$: power of the attachment lens means
- $f_i$: focal distance when the i-th rear lens group is mounted on the zoom lens
- $S_i$: back focus
- $E_{1i}$: distance between the rear principal point of the i-th first sub-group and the front principal point of the rear group
- $E'_{2i}$: distance between the rear principal point of the i-th first sub-group and the front principal point of the attachment lens means when the attachment lens means is inserted
- $E'_{3i}$: distance between the rear principal point of the attachment lens means and the front principal point of the second sub-group
- $m$: ratio of the focal length before the attachment lens means is inserted and that after the attachment lens means has been inserted
- $\Delta E$: distance between the principal points of the attachment lens means.

3. A zoom lens in accordance with claim 1, wherein the attachment lens means consists of at least two sub-groups with a space between them.

4. A zoom lens in accordance with claim 3, wherein the attachment lens means has a positive power.

5. A zoom lens according to claim 1, in which each of the rear lens groups is composed of a first sub-group and a second sub-group spaced from each other, and the attachment lens means is inserted between the first sub-group and the second sub-group.

* * * * *